March 16, 1926.

A. MAZAC

BELT CONNECTER

Filed August 6, 1925    2 Sheets-Sheet 1

Inventor
A. Mazac
By Bryant & Lowry
Attorneys

March 16, 1926.  A. MAZAC  1,576,526

BELT CONNECTER

Filed August 6, 1925   2 Sheets-Sheet 2

Inventor
A. Mazac
By Bryant & Lowry
Attorneys

Patented Mar. 16, 1926.

UNITED STATES PATENT OFFICE.

ANTON MAZAC, OF POLAR, WISCONSIN.

BELT CONNECTER.

Application filed August 6, 1925. Serial No. 48,531.

*To all whom it may concern:*

Be it known that I, ANTON MAZAC, a citizen of the United States, residing at Polar, in the county of Langlade and State of Wisconsin, have invented certain new and useful Improvements in Belt Connecters, of which the following is a specification.

This invention relates to new and useful improvements in belt connecters.

The primary object of the invention is the provision of means for connecting two belt ends together in such a manner that the said ends may be disconnected when desired, and yet no danger of the unintentional disconnection of the ends will exist.

A further object of the invention is to provide a connecter suitable for use in joining the ends of pulley belts used to drive machinery, and the like.

Other objects and advantages of the invention will be apparent during the course of the following description.

Figure 1:
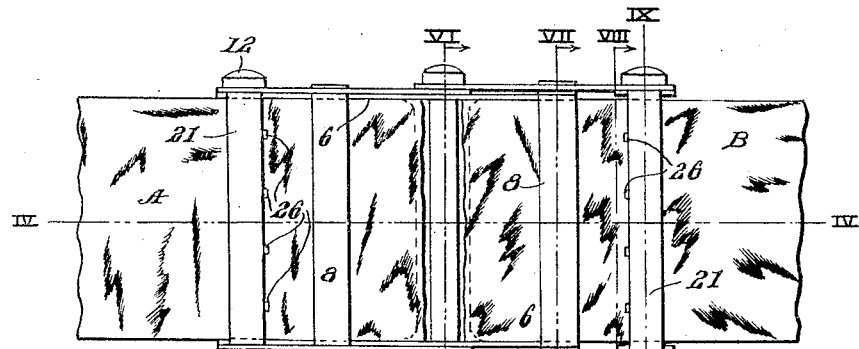
Figure 2:
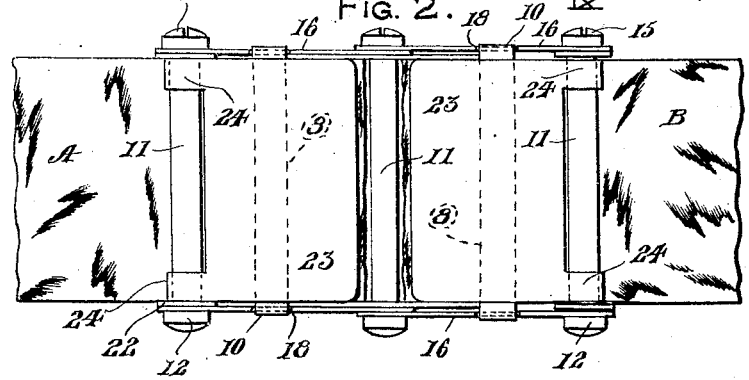
Figure 3:
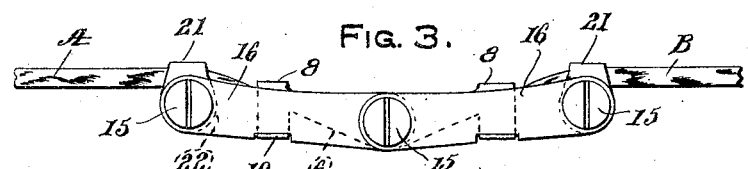
Figure 4:
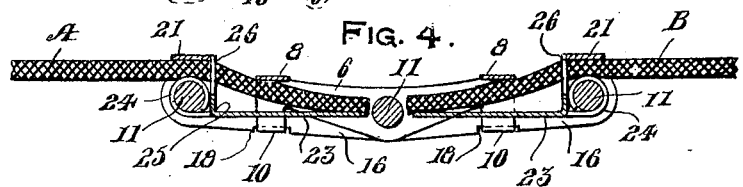
Figure 5:
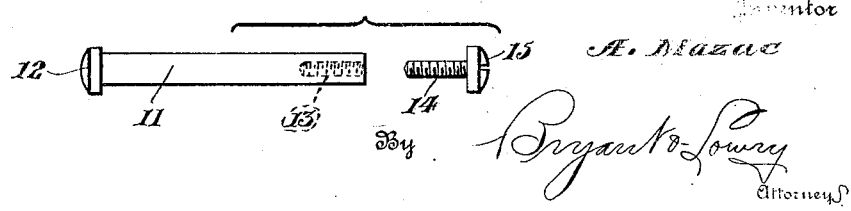
Figure 6:
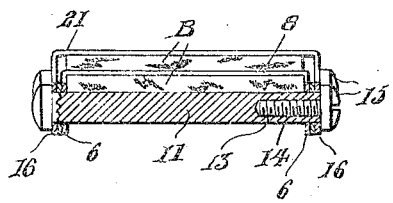
Figure 7:
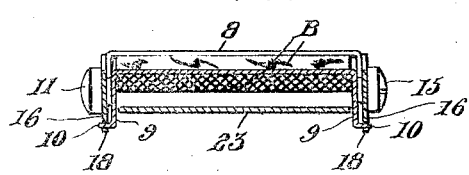
Figure 8:
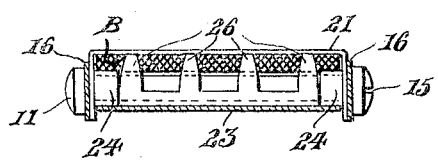
Figure 9:
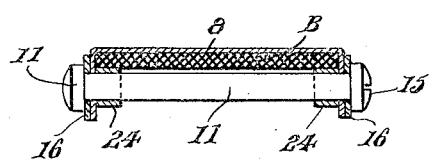
Figure 10:
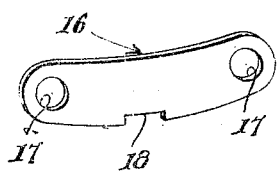
Figure 11:
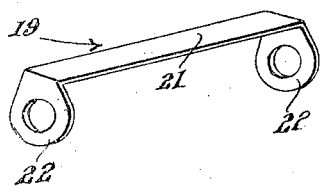
Figure 12:
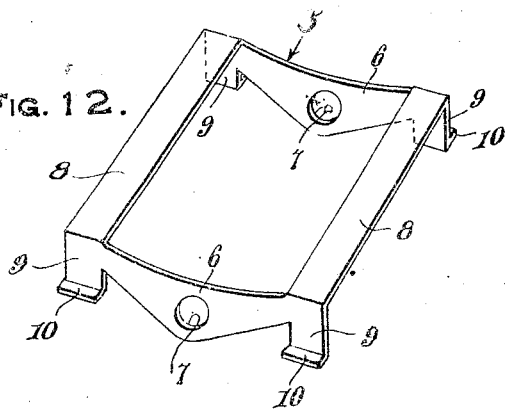
Figure 13:
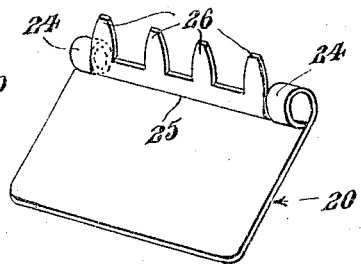

In the accompanying drawings forming a part of this specification and in which like numerals are employed to designate like parts throughout the same, Figure 1 is a bottom plan view of the belt connecter embodying this invention, Figure 2 is a top plan view of the connecter shown in Fig. 1, Figure 3 is an edge elevational view of the belt connecter, Figure 4 is a longitudinal sectional view taken upon line IV—IV of Fig. 1, Figure 5 is a detail plan view of the type of fulcrum pin or bolt embodying this invention, Figure 6 is a transverse sectional view taken upon line VI—VI of Fig. 1, Figure 7 is a transverse sectional view taken upon line VII—VII of Fig. 1, Figure 8 is a tranverse sectional view taken upon line VIII—VIII of Fig. 1, Figure 9 is a transverse sectional view taken upon line IX—IX of Fig. 1, Figure 10 is a detail perspective view of a type of link embodying this invention, Figure 11 is a detail perspective view of a type of strap which forms a part of the connecter, Figure 12 is a detail perspective view of the frame portion of the connecter, and Figure 13 is a detail perspective view of one of the belt end clamping members which forms a part of the connecter.

In the drawings wherein for the purpose of illustration is shown a preferred embodiment of this invention, the numeral 5 designates in its entirety the frame portion of the connecter, shown in detail in Fig. 12. This frame includes the substantially triangularly-shaped side plates 6 having the axially alined bearing openings 7 formed intermediate the ends of the same. These side plates 6 are connected together and held in spaced relation to each other by the straps 8 which extend transversely of the same and have the right-angularly arranged side pieces 9 to which the ends of the side plates 6 are integrally connected. The extremities of the side pieces 9 are formed with laterally, outwardly projecting lugs 10 which are arranged at right angles to the side pieces 9.

Figure 5 shows in detail a type of fulcrum pin or bolt employed at various points in this belt connecter. This fulcrum pin or bolt includes the cylindrically-shaped shank portion 11 having the integral head 12 formed at one end and the internally screw-threaded bore 13 formed in the other end and extending axially thereof. A screw 14 is intended to be threaded into the bore 13 and is provided with a slotted head 15 for this purpose.

One of these fulcrum pins or bolts is intended to be positioned within the bearing openings 7 formed in the frame 5 and is employed for connecting to this frame four links 16, of the type illustrated in detail in Fig. 10, which are arranged in opposed pairs with one pair located outwardly of each side plate 6 of the frame and with the fulcrum pin or bolt pivotally connecting the adjacent end of the links to the opposite sides of the frame 5. It is believed that a detail description of the link 16 shown in Fig. 10 will be sufficient for all of the four links just referred to. This link is of somewhat arcuate formation and is provided with aperture 17 at the opposite ends of the same. The outer edge of this link is formed with a notch 18 which is of substantially rectangular formation.

The fulcrum pin or bolt received within the apertures 7 formed in the frame 5 is also received in one of the end apertures 17 of each of the links 16 with the said links arranged so that their notches 18 will register with the laterally projecting lugs 10 formed on the ends of the side pieces 9. It will now be seen that these links may pivot in one direction in respect to the plane of the frame 5, but the engagement of the lugs 10 in the notches 18 will prevent the links from pivoting in the opposite direction to the plane of the frame.

The outer ends of the parallel pairs of links 16 are connected by the type of fulcrum pins illustrated in Fig. 5 which are received within the end apertures 17 of the said links. These fulcrum pins connect to the outer ends of the links strap members 19, see Fig. 11, and belt gripping members 20, see Fig. 13. The strap member 19 includes a body portion 21 having the enlarged end ears 22 which are apertured and extend at right angles to the body portion 21. The belt gripping member 20 includes an actuating plate 23 which has formed at one edge thereof the bearings 24 projecting beyond this edge 25 of the plate 23 and the series of teeth 26 which are connected to or formed integrally with the edge 25 of the plate 23 and extend at right angles to the latter.

Figures 1 to 4 inclusive show the ends A and B of a belt connected together by the device embodying this invention. Figure 4 clearly shows that each one of the strap ends is located between a fulcrum pin carried by the outer ends of two of the links 16 and the body portion 21 of one of the straps 19. The strap end is further illustrated as overlying a transverse strap 8 of the frame 5. The pivoted belt gripping member 20 is intended to be actuated by applying pressure to the plate 23 for causing the same to pivot to embed or bury the series of teeth 26 in the end of the strap. When the belt end gripping member 20 is arranged as clearly shown in Fig. 4, the teeth 26 are positioned in engagement with one edge of the body portion 21 of the strap 19 so that this strap acts as a backing member or opposing strap for preventing the belt end from becoming disconnected from the teeth 26. Each of the strap ends A and B are connected to the frame 5 in the manner just described. It will now be seen that the links 16 with their belt gripping members 19 and the backing straps 21 opposing the teeth of the member 20 may be pivoted in respect to the frame 5 in a manner to cause the lugs 10 of the frame to be withdrawn from the notches 16 of the links. Pivotal movement of the links and the belt end in the opposite direction in respect to the plane of the frame 5 will be prevented, however, by the lugs 10. To disconnect the belt ends from the connecter, the teeth 26 may be withdrawn from the belt ends by pivoting the elements 20 by means of the plate-like operating member 23.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a belt connecter of the type described, a frame, a fulcrum pin passing transversely through said frame, pairs of links pivoted to each end portion of said pin outwardly of the frame sides, fulcrum pins connecting the ends of the links located on opposite sides of the frame, belt end gripping means carried by the last mentioned fulcrum pins, said means including a member having belt engaging teeth, and a strap opposing the teeth to prevent the belt from moving away from the latter.

2. In a belt connecter of the type described, a frame including side plates having central openings, and transverse straps connecting the ends of said side plates to hold the latter in parallelism, a fulcrum pin passing through said openings, links pivoted on the ends of said pin outwardly of said side plate, pins connecting the ends of the links located on opposite sides of said frame, whereby the pins will be located longitudinally of the opposite ends of the frame, means carried by the frame for limiting the pivotal movement of the links in respect to the frame, and belt end gripping means carried by the last mentioned pins.

3. In a belt connecter of the type described, a frame including side plates having central openings, and transverse straps connecting the ends of said side plates to hold the latter in parallelism, a fulcrum pin passing through said openings, links pivoted on the ends of said pin outwardly of said side plate, pins connecting the ends of the links located on opposite sides of said frame, whereby the pins will be located longitudinally of the opposite ends of the frame, means carried by the frame for limiting the pivotal movement of the links in respect to the frame, belt end gripping means carried by the last mentioned pins, said belt end gripping means including a member having belt engaging teeth, and a strap opposing the teeth to prevent the belt from moving away from the teeth.

In testimony whereof I affix my signature.

ANTON MAZAC.